Feb. 18, 1958

F. TRINCA 2,823,725

LOCKING DEVICES

Filed June 4, 1957

INVENTOR.
FREDERICK TRINCA

BY
*Albert J. Kramer*

ATTORNEY

Feb. 18, 1958   F. TRINCA   2,823,725
LOCKING DEVICES
Filed June 4, 1957   3 Sheets-Sheet 2
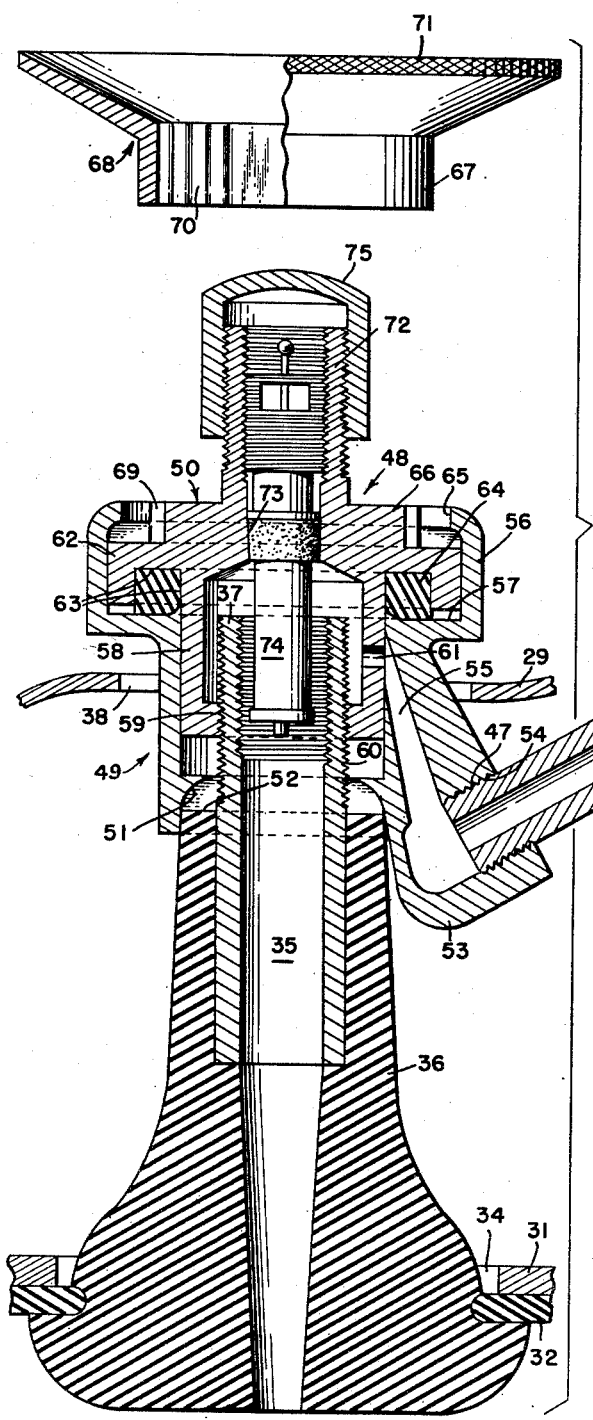
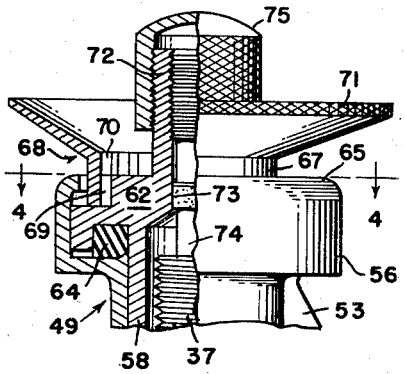
FIG. 3.
FIG. 2.
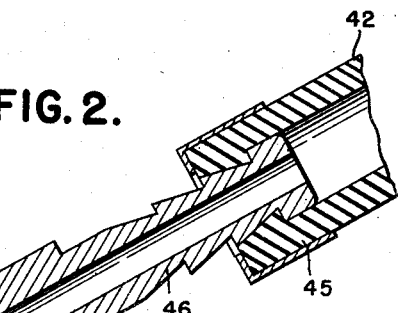
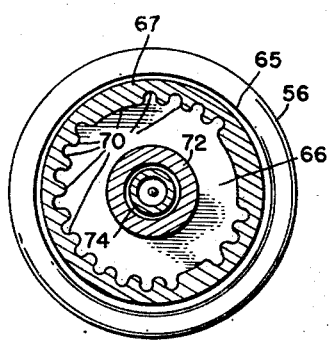
FIG. 4.
INVENTOR.
FREDERICK TRINCA
BY
*Albert J. Kramer*
ATTORNEY Feb. 18, 1958 F. TRINCA 2,823,725
LOCKING DEVICES
Filed June 4, 1957 3 Sheets-Sheet 3
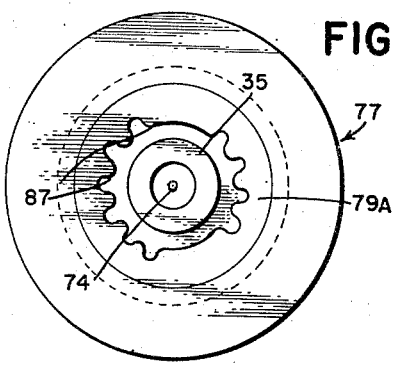
FIG. 10.
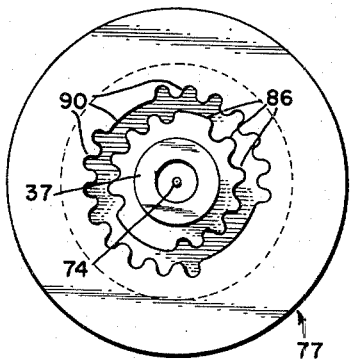
FIG. 12.
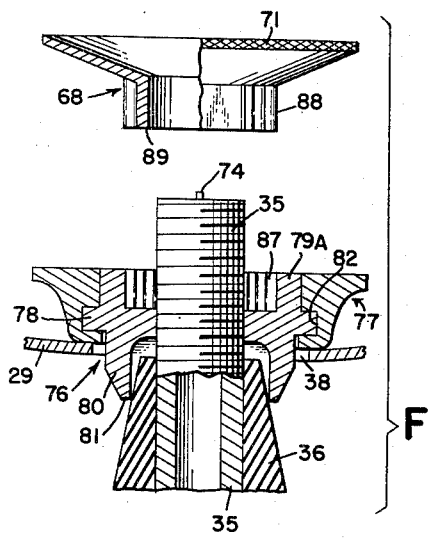
FIG. 11.
FIG. 9.
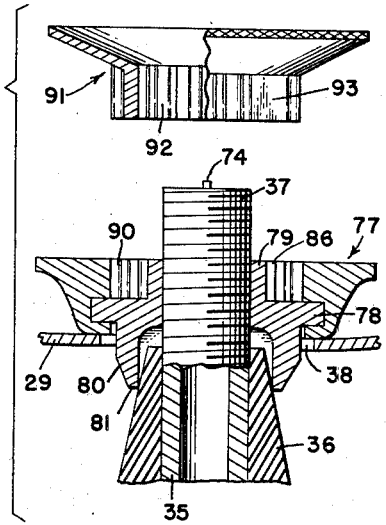
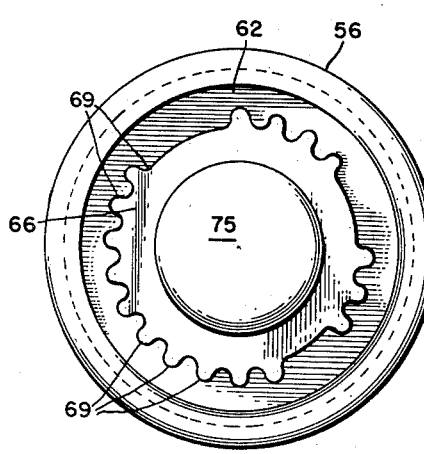
FIG. 5.
INVENTOR.
FREDERICK TRINCA
BY
Albert J. Kramer
ATTORNEY

United States Patent Office 2,823,725
Patented Feb. 18, 1958

2,823,725
LOCKING DEVICES
Frederick Trinca, Rego Park, N. Y.
Application June 4, 1957, Serial No. 663,528
8 Claims. (Cl. 152—431)

This invention relates to locking devices and it is more particularly concerned with locking devices for securing against loss of the cover plate of an automobile wheel and parts associated therewith which cannot be removed from the vehicle without first removing the cover plate.

It is known to equip automobile wheels with air pressure gauges to indicate constantly the air pressure in each wheel tire. A preferred type of such gauge is provided with an air tube that extends from the gauge to the air valve of the tire. Such gauges are relatively expensive and they are subject to theft when an automobile is left unguarded in a public place, for example. Accordingly, one of the objects of this invention is the provision of a locking device for use with gauges of the type mentioned to secure the gauge, cover plate, and wheel itself against unauthorized removal from the vehicle.

Another object of the invention is the provision of a locking device for use on vehicle wheels that can be used to secure the wheel cover plate and wheel apart from such a gauge.

A further object of the invention is the provision of a locking device for the purposes indicated having highly effective pick resistant characteristics.

A still further object of the invention is the provision of such locking devices which can be purchased and installed readily on a vehicle without requiring the services of a skilled mechanic.

A still further object of the invention is the provision of locking devices of the type mentioned which is held in firm and secure engagement with the usual rubber casing of the tire valve body to prevent the locking device from becoming loose through road vibration and also to establish an air seal therebetween.

These objects and still other objects, advantages and features of the invention will appear more fully from the following description in conjunction with the accompanying drawing.

In the drawing:

Fig. 2 is a longitudinal cross-sectional view through the valve of the embodiment of Fig. 1 on a larger scale, together with the key member thereof in elevated position.

Fig. 3 is a view of the upper part of the structure of Fig. 2, partly in section, with the key member in operative position.

Fig. 4 is a section along the line 4—4 of Fig. 3.

Fig. 5 is a top plan view of the structure of Fig. 2, partly broken away and without the key member.

Fig. 9 is a view similar to Fig. 7 of a modified form of the embodiment.

Fig. 10 is a top plan view of Fig. 9 without the key member.

Fig. 11 is a view similar to Fig. 7 showing a further modification of the embodiment.

Fig. 12 is a plan view of Fig. 11 without the key member.

Figure 1:
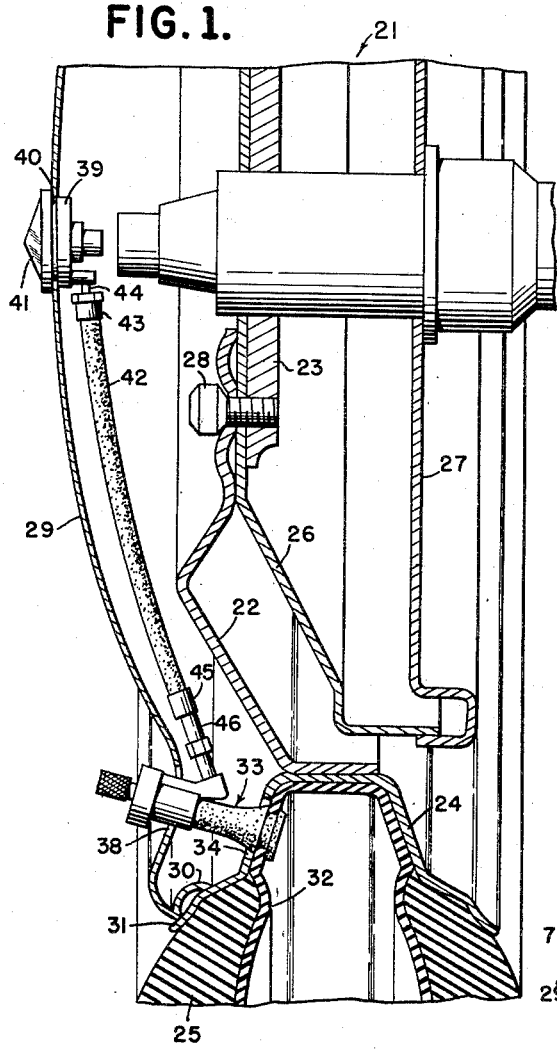
Fig. 1 is a cross-sectional view of part of a typical automobile wheel equipped with a cover plate, a form of tire gauge, and an embodiment of this invention.

Referring with more particularity to the drawing in which like numerals designate like parts the embodiment of Figs. 1 to 5 is illustrated in connection with a typical automobile wheel 21 having a wheel body 22 fixed to and rotatable with its hub 23 and carrying a channeled rim 24 in which is mounted a pneumatic tire 25 which may be of any conventional type. The body supports a brake drum 26 closed at its inner side by the usual cover or back plate 27 mounted conventionally on the wheel housing. The usual wheel lug bolts 28 secure the wheel in place to the hub 23 and brake drum 26, substantially as shown.

The wheel body structure as shown includes a detachable hub cap or outer wheel cover plate 29 which is usually provided with a resiliently yieldable marginal portion 30 for snap engagement with an edge portion or ridge 31 on the outside of the channeled rim 24.

The tire 25 has an inner tube 32, but it may just as well be of the tubeless type, and it is provided with the usual tapered nipple stem 33 which projects outwardly through an aperture 34 in the rim 24 and through an aperture 38 in the cover plate 29. The stem 33 customarily comprises a hollow metallic core 35 partially surrounded by a rubber casing 36 to the extent that a threaded section 37 of the core 35 projects beyond the outer end of the casing 36.

A form of air pressure gauge comprising a gauge body 39 is mounted concentrically with the hub, between the said hub and the cover plate 29. The cover plate has a central aperture 40 in which there is disposed the gauge body 39 from the inner side. The gauge includes a window 41 through which its indicator (not shown) may be viewed from the outside.

Extending from the gauge body 39 is a tube 42 to communicate the gauge with the air in the tire. The tube 42 lies between the cover plate 29 and the wheel body 22.

One end of the tube 42 is provided with a union nut 43 for connection to a nipple 44 of the gauge that communicates with the air pressure indicating mechanism (not shown) on the interior of the gauge. The other end 45 of the tube 42 is also adapted to frictionally engage the outer end of a coupler 46. The inner end of the coupler 46 is threaded at 47 for removable connection to an adapter 48. The adapter comprises an outer body section or shell 49 and an inner section 50.

The shell 49 is generally cylindrical in shape to fit about the outer end 37 of the core 35. The lower end has an annular seat 51 which is adapted to receive the upper end 52 of the rubber casing 36.

A hollow lobe or boss 53 is integral with the section 49 and is fused to the outer side thereof. It extends below the seat 51. A threaded aperture 54 through the outer wall of the boss 53 receives the inner threaded end 47 of the nipple 46. A passageway 55 extends from the interior of the boss 53 to the inner side of the body section 49, as shown.

An upper portion 56 of the body 49 is somewhat enlarged radially to provide an upwardly facing annular shoulder or shelf 57.

The inner section 50 fits within the shell 49 and comprises a bottom skirt portion 58 that fits between the outer end portion 37 and the shell 49. The lower end 59 of the skirt portion 58 is inwardly flanged and carries internal threads for engaging the threads 60 of the portion 37. The space between the portion 37 and the skirt 58 is communicated with the interior of the boss 53 by means of an aperture 61 through the wall of the skirt.

Above the skirt portion 58 an annular flange portion 62 forms an integral part of the inner section 50. It is disposed in the enlarged upper section 56 and it is provided with an annular bottom groove or inverted channel 63 as a retainer for an annular rubber gasket 64. This gasket is thicker than the channel so as to project downwardly from it and it rests upon the shelf 57.

With this arrangement, there is provided effective air sealing between the upper end 52 of the rubber casing 36 and the flange 62 to prevent the escape of air to the exterior from the tire.

The upper annular edge 65 of the enlarged portion 56 is turned inwardly so as to retain within it the flange 62.

Surmounting the flange 62 is an annulus 66 recessed inwardly from the edge 65, the annular space therebetween being for the reception of the bottom cylindrical part or ring 67 of a funnel-shaped key member 68 for use in placing the device on and taking it off the core end 37. The periphery of the annulus 66 is provided with corrugations 69, preferably of an exclusive pattern. The bottom cylindrical part or ring 67 of the key member has on its inner face a correspondingly reverse pattern of corrugations 70 to permit a meshing therebetween. The outer edge 71 of the key member which is of larger diameter than the ring 67 to present a mechanical advantage is knurled to act as a finger grip for turning the key when it is in operative position.

Surmounting the annulus 66 is a nipple or hollow stem 72 which is threaded on both the inside and outside. The inside communicates with the interior of the skirt 58 and it contains an annular seat 73 for the conventional type of air valve 74 used on pneumatic tires. The exterior threads of the nipple are for the conventional dust cap 75.

The device is applied by first removing the cover plate 29 from the wheel and installing thereon the gauge 39 with tube 42. The valve conventionally associated with the core 35, like the valve 74, is removed from the interior thereof. The adapter 48 with the nipple 46 removed is then placed in the aperture 38 of the cover plate by inserting the boss 53 first, the enlarged portion 56 being larger than the aperture 34 and thus serving to keep the cover plate on the lower end of the adapter. The nipple 46 is then replaced on the boss and the tube 42 connected thereto. The cover plate with the adapter thus in place is then replaced on the wheel with the adapter in position over the core 35. The key 68 is then inserted (see Fig. 3) and rotated until the skirt 58 is tightly screwed on the outer threads of the core 35. The key is then removed and the device is fully installed. It cannot be removed without the key. The cover plate and gauge are thus secure against unauthorized removal. At the same time, the adapter does not interfere with the adjustment of air pressure inside the tire.

Figure 8:
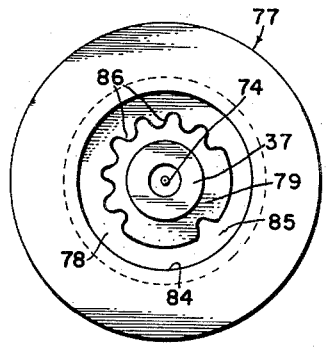
Fig. 8 is a top plan view of the embodiment of Figs. 6 and 7 without the key member.
Figure 7:
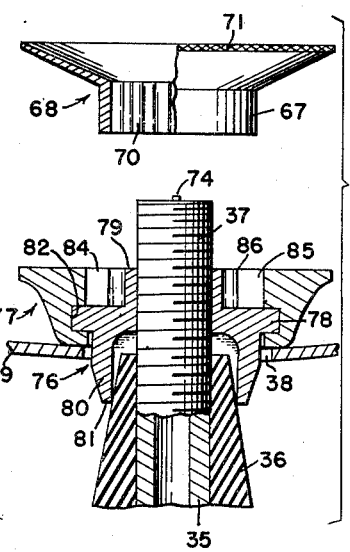
Fig. 7 is a longitudinal sectional view through the valve of the embodiment shown in Fig. 6 with the key member in elevated position.
Figure 6:
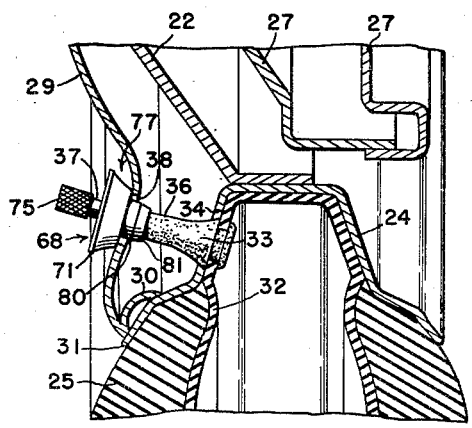
Fig. 6 is a fragmentary portion of Fig. 1, modified to illustrate a form of the invention used without the tire gauge.

The embodiment illustrated in Figs. 6, 7 and 8 is for use independently of the pressure gauge and it comprises a pair of concentric inner and outer members 76 and 77, respectively, rotatable relative to each other. The inner member comprises a ring 78 surmounted by a hollow neck portion 79 on one side. An annular skirt 80 projects from the other side. The ring and neck have internal threads which are adapted to engage the exterior threads on the upper end 37 of the core 35. The skirt 80 is adapted to pass through the aperture 38 of the cover plate 29 with the lower end 81 thereof firmly pressed against the rubber casing 36.

The outer member 77 is provided with an annular groove 82 on its inner wall to rotatably engage the periphery of the ring 78. Above the groove 82, the inner wall 84 of the outer member surrounds the neck 79 and is in spaced relation thereto to provide a narrow annular space 85 for the reception of the lower part 67 of the key member 68. The periphery of the neck portion is provided with an exclusive arrangement of corrugations 86 to match the corrugations 70.

The embodiment of Figs. 9 and 10 is in all respects the same as that of Figs. 6 to 8, except that the neck portion 79A instead of being threaded like the portion 79 to engage the threads of the section 37 is actually enlarged to provide an annular space between this section and its inner wall, which inner wall is provided with corrugations 87 of an exclusive design. The key member in this embodiment has its matching corrugations 88 on the outside of the lower ring part 89 instead of on the inside as in the previous embodiments.

The embodiment of Figs. 11 and 12 is also the same in all respects as that of Figs. 6 to 8, except that the inner wall of the outer member 77 is also provided with corrugations 90 and the key member 91 has corrugations 92 and 93 on both the inside and outside to match the corrugations 86 and 90 respectively. With this embodiment, the possible number of exclusive combinations between the two sets of corrugations is greatly multiplied.

In actual practice, it is convenient to provide a set of, say, 4 such devices, one for each wheel of an automobile all devices of the set having the same corrugations design so that a single key member will fit all the devices of a single automobile.

Having thus described my invention, I claim:

1. A combined air gauge adapter and lock for an automobile wheel cover plate for application to the threaded nipple of a tire valve body projecting through an aperture in said plate, comprising an outer shell adapted to be disposed in the aperture about the nipple and having a hollow enlarged portion greater than the aperture, a hollow inner member rotatably disposed within the shell having one end threaded to engage the threads of the nipple with its hollow portion in communication with the said nipple, a hose coupler removably mounted on the exterior of the shell, and means communicating said coupler with the interior of the hollow inner member; a portion of the inner member lying within the enlarged portion of the shell and having a corrugated cylindrical surface, a portion of the shell being annular and spaced from said surface, a hollow stem integral with the inner member and projecting outwardly from the enlarged portion, an air valve in said stem, and a removable key member having a cylindrical portion adapted to fit in the space between the shell and corrugated surface to mesh with the corrugations of the latter.

2. A combined air gauge adapter and lock for an automobile wheel cover plate for application to the threaded nipple of a tire valve body projecting through an aperture in said wheel cover plate, comprising an outer shell adapted to be disposed in the aperture about the nipple and having a hollow enlarged portion greater than the aperture, a hollow inner member rotatably disposed within the shell having one end threaded to engage the threads of the nipple with its hollow portion in communication with the said nipple, a hose coupler carried on the exterior of the shell, means communicating said coupler with the interior of the hollow inner member, a portion of the inner member lying within the enlarged portion of the shell and having a corrugated cylindrical surface adapted to mesh with a corresponding corrugated key member, a portion of the shell being annular and spaced from said surface, a hollow stem integral with the inner member and projecting outwardly from the enlarged portion, and an air valve in said stem.

3. The combined adapter and device as defined by claim 2 having air sealing means between the shell and the inner member and between the nipple and the shell.

4. The combined adapter and device as defined by claim 2 having air sealing means within the enlarged portion between the shell and inner member and additional air sealing means between the nipple and the shell.

5. A locking device for an automobile wheel cover plate for application to the threaded nipple of a tire valve body projecting through an aperture in said cover plate, said device comprising an inner annular member, an outer annular member concentric with and rotatably mounted on the inner member, said outer member having an inner wall and a circular groove in the inner wall engaging a peripheral portion of the inner member, said inner member having a concentric threaded aperture for engaging the said nipple, and a hollow stem projecting upwardly from the inner member having a portion thereof opposite and spaced from an end portion of the said inner wall of the outer member, said hollow stem portion having corrugations to engage matching corrugations of a circular key member.

6. A locking device as defined by claim 5 in which the inner wall of the outer member opposite the said portion of the stem is also corrugated.

7. A locking device as defined by claim 5 in which the hollow stem is spaced from the locus of the nipple and is provided with corrugations on its surface facing the said locus of the nipple for engagement by a key member.

8. A locking device as defined by claim 5 in which a portion of the nipple has a rubber casing and the inner member has a skirt portion projecting therefrom through the outer member on the side opposite the stem to forceably engage the rubber casing.

References Cited in the file of this patent

UNITED STATES PATENTS

| | | |
|---|---|---|
| 1,948,202 | Shinn | Dec. 11, 1934 |
| 1,998,900 | Lombardo | Apr. 23, 1935 |
| 2,747,940 | Tracy | May 29, 1956 |
| 2,778,215 | Redmond | Jan. 22, 1957 |